3,236,732
PREGNANCY TEST METHOD AND IMMUNOLOGICAL INDICATOR THEREFOR

Edward R. Arquilla, Los Angeles, Calif.
(1260 S. Arroyo Blvd., Pasadena, Calif. 91105)
No Drawing. Filed Jan. 22, 1962, Ser. No. 167,898
13 Claims. (Cl. 167—84.5)

This case is a continuation-in-part of Serial Number 67,890 filed November 8, 1960, for the same inventor, now abandoned.

This invention relates to a novel immunological diagnostic test for use in determining the presence or absence of pregnancy, especially in the human female. More particularly, this test is based on an immunological preparation and a method which specifically determines pregnancy by tests conducted on a body fluid, such as a urine sample, obtained from a women suspected of being pregnant.

Heretofore a number of pregnancy tests have been utilized. These are biological tests which involve the use of a specific animal. Among such tests is one familiarly known as "The Rabbit Test" (also known as the Friedman test) another known as the "The Mouse Test" (also known as the Aschheim-Zondek test) and a third type of test known as "The Frog Test." These tests cannot be performed by the ordinary laboratory technician, they may necessitate several days for execution, require the sacrifice of the animal, and entail a number of intermediate steps and observations.

A serious drawback of biological tests is that many laboratories in hospitals or physicians' offices do not have facilities for keeping animals. Furthermore, the animal used in either the Mouse, Rabbit, or Frog Test has certain specific requirements. The mice must be immature females of a specific age, the rabbits must be virgin females which have not been caged with males and frogs give spurious results during certain seasons. Consequently an immunochemical test for pregnancy has a number of specific advantages. It does not require a supply of specialized animals and will eliminate the skills required to carry out a test with accuracy. In its ultimate application it is envisioned that the test can be carried out in a physician's office without the necessity of a laboratory. Furthermore the test may be carried out by an unskilled person such as a receptionist or physician's nurse.

The instant invention is based on an immunological method for the detection of significant quantities of the hormone chorionic gonadatropin—hereinafter referred to as CGTH. This immunological technique represents a substantial improvement when compared to ordinary chemical or biological assays.

Chemical tests, which are satisfactory for the detection of relatively simple molecules, e.g., glucose, ketone, aldehyde, and so forth, cannot distinguish between complex highly complicated molecules belonging to the same family or category of compounds. For example, one may not by chemical tests, differentiate between separate members of the family of proteins, muco-proteins, lipo-proteins, polysaccharides, and the like. Therefore, most chemical reactions, whether for the protein or polysaccharide portion of CGTH cannot distinguish pregnant from non-pregnant urine.

Immunological tests however, are specific for the steric configuration of the molecule, and adapt themselves to the superficial portion thereof. Since the antibodies present in the antiserum fit homologously with the CGTH they are capable of distinguishing this complex protein from others of the same family which may have similar or identical chemical compositions. This characteristic of immunological tests has been amply substantiated in the past principally by the work of Carl Landstiener and others. Using immunological techniques therefore, it is possible to prepare specific "tags" for antigens; such specificity is not possible by any simple chemical test using organic or inorganic materials.

The hormone CGTH is produced by placental tissue. This tissue has been noted morphologically at 10 to 11 days gestation in the human female. When the placental tissue begins to form as the result of pregnancy, the CGTH produced by the placenta begins to appear in the urine of women. It has been found that within two to three weeks after fertilization a sufficient amount of CGTH is present in women to detect by the instant immunological technique. It is also interesting to note that this hormone is produced in increasing concentrations up to about 16 to 18 weeks after conception and is thereafter present in decreasing amounts, while still remaining above normal values through the 40th week of pregnancy.

As was stated above, the invention relates to a pregnancy test which is based on the immunological detection of the specific hormone chorionic gonadotropin.

As will be appreciated, the use of the immunological reactions is well known in the art. Antibodies or "immune bodies" play a key role in immunological procedures. For example, an antibody is formed by an individual, be it animal or human, when an antigen gains access to the lymphatic or blood vascular system. These antibodies are found in the gamma globulin portion of the blood serum. Since these antibodies are formed to fit with the external or steric configuration of the analogous antigen, they possess a high degree of specificity with respect to their ability to combine with the analogous antigen and will do so selectively in a mixture of other similar materials (i.e. a specific protein in a mixture of proteins). It is, therefore, possible to detect the presence of very small amounts of an antigenic substance in the presence of large quantities of other similar materials by the use of an antibody which is specific to a particular antigenic substance.

Briefly, the instant invention comprises a test for pregnancy wherein a body fluid such as blood, serum, urine and the like, is contacted with an indicator system for detecting the presence or absence of the hormone chorionic gonadotropin in said body fluid. In its broader aspects the invention contemplates contacting said body fluid with an antiserum or antibody for CGTH and an indicator system utilizing immunological techniques.

The indicator system comprises an indicator material which has been treated with CGTH so that in the presence of the antibody the indicator material will discolor, become colored, agglutinate, precipitate, or give some other visible indication of the presence or absence of CGTH in the body fluid being tested.

The indicating material referred to above may be a particulate material such as red blood cells, e.g. sheep erythrocytes, or easily obtainable red blood cells from other animal sources. It may also comprise a latex suspension such as a particulate suspension of polybutadiene, polystyrene, polymerized butadiene styrene, etc., finely divided organic material, comminuted siliceous materials, etc.

It is contemplated by the inventive concept that the particulate material may be contacted directly with CGTH in which instance, the hormone adheres to the surface of the particles by electrostatic forces, van der Waal forces or the like. It is also contemplated however, that the CGTH may be attached to the particulate matter by means of a chemical bond such as by the use of conjugating materials exemplified by bis-diazo benzidine (BDB) and the like. In this instance, the latex suspension of the sheep red cells for example, are contacted first with BDB mixture then contacted with CGTH. Other means of preparation of the indicator material may be used without departing from the scope of the inventive concept.

When a particulate material such as sheep erythrocytes is used it is preferred that it be treated prior to conjugation through the conjugation agent in some manner as to improve its stability. For example, the red blood cells may be treated with formaldehyde, tannic acid or other of the known preservative materials, to render them more resistant to hemolysis. When a latex particulate suspension, finely defined organic matter or finely comminuted siliceous material is used, this stabilizing treatment is of course, not required.

As was stated above, the detection of CGTH in the body fluid necessitates contacting the fluid with an antiserum to CGTH and the immunological indicator described. This may be done by the admixture of liquid reagents in the test tube, as for example, the addition of the immunological indicator to a liquid mixture of the body fluid and the antiserum. It is also contemplated that the indicator may be lyophilized as may the antiserum and reconstituted with an appropriate solution immediately prior to carrying out the test. The inventive concept encompasses however, any physical means of contacting the indicating system with the body fluid to be tested. For example, the indicating system may be formed into or incorporated within a tablet. It may be impregnated upon a paper strip and the body fluid to be tested merely dropped thereon or the paper strip dipped therein.

The invention also contemplates an immunological indicating system comprising a complexed CGTH reacted with the antibody to CGTH so that two or more complexes may be aggregated together. When contacted with a body fluid which contains CGTH these aggregate dissociate, due to the greater affinity of the antibody for the free CGTH than the complexed CGTH to which it is attached. This dissociation can be discerned by some interpretable manifestation such as color formation, color migration, physical change or the like. This system similarly may be incorporated into a test tablet, deposited upon a bibulous carrier such as a paper strip, or some such physical form to increase the ease of utilization.

In accordance with inventive concept, antibodies of CGTH are prepared by injecting CGTH in Freund's complete adjuvant and/or a saline solution of CGTH into a host such as a rabbit. After a stated period of time the host is bled and the serum containing the antibodies is separated. The presence of antibody in the serum can be established by conventional immunochemical procedures or by its use in a test system such as that described below.

Sheep red cells may be employed as an indicating system and may be prepared by complexing the red cells with CGTH using bis-diazobenzidine. When this indicating system is added to a system containing the specific antibody to CGTH the red cells are detectably agglutinated. However, if the red cell-bis-diazobenzidine-CGTH indicator is added to a test sample which does not contain CGTH antibody then no hemagglutination will occur.

Thus, the addition of urine from a pregnant woman, that is to say urine containing CGTH, to a rabbit Chorionic Gonadotropin antiserum (serum containing CGTH antibodies) results in a combination between the antibodies in the antiserum and the CGTH in the pregnant urine. When the indicator, red blood cells complexed with CGTH, is present in the mixture it cannot combine with the antibodies in the rabbit antiserum since these antibodies have preferentially reacted with the free CGTH in the test sample. Thus, hemagglutination does not take place. Therefore, the urine from a pregnant woman results in no hemagglutination whereas urine from a non-pregnant woman results in a definite and detectable hemagglutination.

It is to be seen, therefore, that this concept of the invention involves the steps of contacting a test urine sample with two reagents: (1) a material containing CGTH antibodies, and (2) an indicator material exemplified by red blood cells which have been conjugated with CGTH. If the test sample contains CGTH, that is to say, if the urine is from a pregnant woman, there will be no hemagglutination observable. If on the other hand the urine does not contain CGTH, as from a woman who is not pregnant, a definite observable reaction will be obtained.

There is set out in detail below the preparation of a number of reagents which are used in this invention.

PREPARATION OF VERONAL BUFFERED SALINE (VBS)

A quantity of 5.75 g. of barbital (veronal) is dissolved in 500 ml. of hot distilled water. The solution is allowed to cool and there is added thereto 85.0 g. of sodium chloride, 3.75 g. of sodium barbital, 5 ml. of a 1 molar solution of magnesium chloride and 1.5 ml. of a 1 molar solution of calcium chloride. The solution is then made up with distilled water to 2 liters and stored at 0° C.

This is a 5-fold concentration of VBS. When this VBS solution is used one part of the stock solution is added to four parts of distilled water.

PREPARATION OF BIS-DIAZOBENZIDINE (BDB)

To 0.92 g. of benzidine there is added 100 ml. of distilled water and 6 ml. of 6 normal hydrochloric acid. One hundred (100) ml. additional distilled water is added to this mixture. After the benzidine has dissolved the solution is cooled to 0° C. in an ice-salt bath. As soon as ice crystals begin to form in the solution, 6.5 ml of a 10% solution of sodium nitrite are added rapidly while stirring. The stirring is continued until the solution is negative to starch iodide paper. During the stirring the solution should never be allowed to reach a temperature above 1° C.

This material is pale yellow in color and when a phosphate buffer (pH 7.4) is added it turns a reddish brown. The pale yellow solution is stable at room temperature from 5 to 7 hours; at 4° C. it is stable for about 7 days; when frozen and stored at −20° C. it is stable for about 60 days; and when stored below −35° C. it is stable for about 6 months.

PREPARATION OF THE INDICATOR

Sheep erythrocytes were washed once with VBS solution and 2 times with saline. Three (3) ml. of CGTH made up in saline solution to a concentration of 1 mgm. CGTH per ml. were placed in a test tube. To this was added 0.6 ml. of saline and 0.05 ml. of washed, packed sheep erythrocytes. This mixture was gently agitated to ensure an even suspension of the sheep cells.

One-half (½) ml. of bis-diazobenzidine (BDB) solution and 7 ml. of the phosphate buffer solution were thoroughly mixed and 1 ml. of this mixture was added to the test tube above. The test tube was then agitated and allowed to stand at room temperature for 10 minutes. Ten (10) ml. of VBS-albumin were added and the test tube centrifuged at 1700 r.p.m. for 6 to 7 minutes. The supernatant was decanted and the solid material at the bottom of the tube was again washed with about 15 ml. of VBS-albumin. After the washing the solid material representing the sensitized sheep cells was suspended in 2.5 ml. of the diluent.

(The VBS-albumin is prepared by adding 1 g. of bovine serum albumin to 1 liter of VBS solution and heating in an oven to 80° C. for one hour. It is then allowed to cool and stored at 0° C.)

PREPARATION OF CHORIONIC GONADOTROPIN ANTIBODIES

Example 1

A rabbit weighing 3.4 kilograms was given 6 intravenous injections of CGTH dissolved in saline (a total of about 1500 CGTH units) within a space of time of 12 days. Seven (7) days after the last injection, a sample of blood from the rabbit was taken. The blood showed a titre value of 1/40 to 1/360.

The rabbit was given another series of 3 intravenous injections of alum-precipitated CGTH. Seven (7) days after the last injection another blood sample was taken and it showed a titre of 1/1280.

Another blood sample was taken 21 days after the last injection and the blood titre was 1/320. This result indicates that the antibody level tends to fall off rapidly.

This rabbit had received a total of 25 mgm. of CGTH of 2250 I.U.

*Example 2*

A rabbit weighing 3.7 kilograms was injected subcutaneously with a total of 10 mgm. of CGTH dissolved in 5 ml. of saline solution to which had been added 5 ml. of an alum gel solution, the injections given two days apart.

One month after the last injection and again two days later 2½ mgm. of alum-precipitated CGTH was injected by the ear vein. One week after the last injection a blood sample was taken which showed a blood titre of 1/2560; 3 weeks after the last injection the blood titre was 1/640.

*Example 3*

A solution of 10 mg. of CGTH per ml. of saline solution was ad-mixed in equal proportions of Freund's complete adjuvant. One-tenth (0.1) ml. of the mixture was injected into each toe pad of a rabbit weighing approximately 3.5 kilograms. At the end of a two week period a booster injection of ½ ml. of a solution of 5 mg. CGTH per ml. of saline was injected intravenously and two days after the first booster injection a second was given. Samples of blood from this host were withdrawn at the end of one week from the last booster shot, and this blood had a titre of 1/2560.

TEST PROCEDURE

The antiserum is diluted in two rows of test tubes. The dilutions of antiserum range from 1/40 to 1/5120. This is done by making a dilution of 1/40 with the diluent e. g. 1 ml. of the antiserum to 39 ml. of the diluent. 1 ml. of the dilution is placed in the first tube in each row; ½ ml. of this mixture is transferred to the second tube in each row containing ½ ml. diluent and this is repeated until a dilution of 1/5120 is obtained.

In the first row of tubes 0.1 ml. of diluent is added to each tube and in the second row 0.1 ml. of test urine is added. All tubes are then shaken and a drop of the sensitized red cells (sheep erythrocytes conjugated with CGTH) are added to each tube. The last tube showing agglutination of red cells is taken as the end-point. Urine containing CGTH neutralizes the antibodies present and agglutination is noted only at lower dilutions of antiserum, whereas in the row where no CGTH is present, agglutination was noted at a much higher dilution.

CLINICAL STUDIES

Thirty-three (33) pregnant patients from the Obstetrical Out Patient Department of a University Hospital were used in this study.

Fourteen (14) of these patients were tested with an antiserum which was prepared as set out in Example 2 above.

The sheep erythrocytes used were conjugated as follows:

A mixture of 3.0 ml. of CGTH (Parke-Davis Lot # Rx 206108 assayed at 2,700 I.U. per mgm.) of a strength of 1 mgm. per ml. was added to 0.6 ml. saline solution, 0.05 ml. of washed sheep erythrocytes and 1.0 ml. saline solution. This mixture was gently agitated to insure an even suspension of the sheep cells.

One-half (½) ml. of bis-diazobenzidine (BDB) solution and 7 ml. of the phosphate buffer solution were thoroughly mixed and 1 ml. of this mixture was added to the test tube above. The test tube was then agitated and allowed to stand at room temperature for 10 minutes. Ten (10) ml. of VBS albumin were added and the test tube centrifuged at 1700 r.p.m. for 6 to 7 minutes. The supernatant was decanted and the solid material in the bottom of the tube was again washed with about 15 ml. of VBS albumin. This was made up to 2.5 ml. and was approximately a 2% cell suspension.

The antiserum used agglutinated the conjugated cells to a dilution of 1/2560. One (1) microgram of CGTH inhibited this agglutination to a dilution of 1/320. Ten (10) micrograms of CGTH reduced the titre to 0.

One-tenth (0.1) ml. of urine from 6 of the 14 patients reduced the titre below 1/320. This indicated that 0.1 ml. of their urine contained more than 1 microgram of CGTH. One-tenth (0.1) ml. of the urine of 7 of the 14 patients reduced the titre to 1/320 indicating that these 7 patients had the equivalent of 1.0 microgram of CGTH in 0.1 ml. of their urine sample. One (1) patient reduced the titre to 1/640. This indicated that this patient had less than 1 microgram of CGTH in 0.1 ml. of the urine sample.

All 6 of the patients whose urine samples contained more than 1 microgram of CGTH also gave positive Frog Test results. Two (2) of the 7 patients which had the equivalent of 1 microgram of CGTH in their urine gave a positive Frog Test. The other 5 patients all had negative Frog Tests as did the patient who had less than 1 microgram of CGTH in her urine sample.

Subsequently an additional 19 patients were tested The same antiserum preparation and the same CGTH preparation was used.

In this experiment the urine was adjusted to a pH of 7.0 to 7.6 prior to test. The antiserum titre was 1/2560. One-tenth (0.1) microgram of CGTH had no effect. One (1) microgram of CGTH reduced the titre (inhibited the agglutination of the conjugated cells by the antiserum) to a dilution of 1/320. Ten (10) micrograms of CGTH reduced the titre to 0.

Of these 19 patients 4 indicated that 0.1 ml. of their urine contained more than 1 microgram of CGTH. Two (2) of these patients gave positive Frog Tests and the other two gave negative tests. Six (6) of the patients had the equivalent of 1 microgram of CGTH per 0.1 ml. of urine. Five (5) of these patients gave positive Frog Tests and one gave a negative test.

Nine (9) of the patients showed less than 1 microgram of CGTH per 0.1 ml. of urine. Four (4) of these patients gave positive Frog Tests, 2 gave negative tests and 3 questionable Frog Tests, reported as negative.

Combining the data from the 33 patients we have the following:

TABLE I

| | Number of Patients | Frog Test | |
|---|---|---|---|
| | | Positive | Negative |
| More than 1 microgram of CGTH/0.1 ml. of urine | 10 | 8 | 2 |
| The equivalent of 1 microgram of CGTH/0.1 ml. of urine | 13 | 7 | 6 |
| Less than 1 microgram of CGTH/0.1 ml. of urine | 10 | 4 | 6 |

An examination of the data set out in the table above indicates the correlation of the amount of CGTH in the urine and the results of the Frog Test. It can be seen that in the series presented a number of erroneous answers were obtained from the Frog Test. It is particularly evident that when quantities of CGTH of 1 microgram per 0.1 ml. or less are present in the urine the results wtih the Frog Test are erratic.

A second embodiment of the instant invention comprises an improved indicator material which is stable for long periods of time and which may be lyophilized and kept from 6 months to 2 years. This improved indicator may be formed by formalinizing the particulate material used in the preparation of the indicator. For example, sheep erythrocytes are treated with formaldehyde, reacted with Bis-diazobenzidine (BDB) and then conjugated with CGTH.

This embodiment will be more particularly explained by reference to the following:

PREPARATION OF FORMALINIZED SHEEP RED CELLS

Six 2 ml. portions of 37% U.S.P. grade formaldeyhde were adjusted to a pH of 7.3 with 1 N NaOH and the total volume was then brought up to 25 ml. by adding 0.85% saline.

One (1) ml. of packed sheep erythrocytes was washed 3 times by centrifugation from 10 volumes of isotonic saline solution. The washed cells were then suspended in 11.5 ml. of isotonic saline and 12.5 ml. of the formaldehyde solution added. The mixture was held at 37° C for 18 to 20 hours and then washed four times by centrifugation from 10 volumes of distilled water per wash.

PREPARATION OF THE INDICATOR

A 0.5 ml. portion of packed formalinized cells was thoroughly mixed with 10 ml. of saline containing 10 mg. of CGTH. This mixture of cells and CGTH was then thoroughly mixed with a freshly prepared solution of 1.5 ml. BDB in 6 ml. phosphate buffer (0.11 M, pH 7.4). The mixture was then incubated with constant shaking for 20 minutes at room temperature to conjugate the cells to the CGTH with BDB. The conjugate was then washed two times by centrifugation from 100 ml. VBS-albumin. A 1% suspension of the conjugate in VBS-albumin was prepared for use. This suspension may be lyophilized to a light brown powder which is easily resuspended for use.

TEST PROCEDURE

The antiserum is diluted in two rows of test tubes. The dilutions of antiserum range from 1/200 to 1/51,200. This is done by making a dilution of 1/200 with the diluent e.g. 0.1 ml. of the antiserum to 19.9 of the diluent. 1 ml. of the dilution is placed in the first tube in each row; ½ ml. of this mixture is transferred to the second tube in each row containing ½ ml. diluent and this is repeated until a dilution of 1/51,200 is obtained.

In the first row of tubes 1 drop of diluent is added to each tube and in the second row 1 drop of test urine is added. All tubes are then shaken and a drop of the sensitized cells (sheep erythrocytes conjugated with CGTH) is added to each tube. The last tube showing agglutination of red cells is taken as the end point. Urine containing CGTH neutralizes the antibodies present and agglutination is noted only at lower dilutions of antiserum, whereas in the row where no CGTH is present, agglutination was noted as much higher dilution as shown in Table II.

TABLE II.—DETECTION OF CGTH USING FORMALINIZED SHEEP CELLS CONJUGATED WITH CGTH

| Antiserum Dilution | Additions | | |
| --- | --- | --- | --- |
| | 1 drop diluent | 1 drop of Test Urine | |
| | | Non-pregnant | Pregnant |
| 1-200 | + | + | + |
| 1-400 | + | + | + |
| 1-800 | + | + | + |
| 1-1,600 | + | + | − |
| 1-3,200 | + | + | − |
| 1-6,400 | + | + | − |
| 1-12,800 | + | + | − |
| 1-25,600 | + | − | − |
| 1-51,200 | − | − | − |

+indicates agglutination; −indicates no agglutination.

To illustrate the stability of the indicator which is prepared by the above described formalinized red cell-BDB-CGTH conjugate, the following data are given:

Sheep red cells were divided into two equal portions. One portion was subjected to the formalinization step as described above and the second portion was untreated. Both portions were then conjugated with BDB and CGTH to prepare indicators for the above described test.

After preparation and testing against a common antiserum, both indicators gave a titre of 1/1280. At the end of one week the indicator using the untreated cells had to be discarded due to lysing of the cells whereas a month later the indicator prepared with the treated cells still gave a titre of 1/1280 with the common antiserum. This indicator was then lyophilized.

At the end of four, and seven months, the lyophilized indicator was reconstituted with distilled water to 6.6 mg./ml. or 1% suspension and gave satisfactory titres at the end of those periods.

Reconstitution followed by incubation at 37° C. overnight did not affect the stability of the indicator prepared from formalinized cells, nor does refrigeration for as long as one month.

The instant invention also has an objective the adaptation of the stable indicator as described above to a diagnostic composition for detecting the presence of CGTH in solution in a simple one-tube test. In this composition the presence or absence of CGTH is detected by means of an immunological indicator which consists of formalinized sheep erythrocytes or other red blood cells which have been conjugated with CGTH using BDB and the conjugate subsequently complexed with the antibody for CGTH. This new, improved immunological indicator may be termed an immune aggregate which consists of red cells conjugated with CGTH and antibody to form an agglutinated complex. When this indicator is exposed to soluble CGTH, as for example, the urine of a pregnant woman, the agglutinated complex tends to become dissociated because the antibody portion of the complex would react preferentially with the CGTH in solution. Thus, when the novel indicator of this invention is combined with the urine of a pregnant woman, that is to say, CGTH in solution, dissociation will occur and the red cells-BDB-CGTH indicator will settle to the bottom of the test container in a non-agglutinated form. If no CGTH is present in solution, as with urine from a non-pregnant woman, the immunological indicator will remain agglutinated.

This concept will be more clearly described as follows:

ONE-TUBE TEST

Rabbit serum containing CGTH antibodies was heated for 30 minutes at 56° C. and then treated with an equal volume of sheep erythrocytes. (This is to remove heterophile antibodies.) This treated rabbit serum (antiserum) was diluted 1 to 8 with VBS-albumin, and ½ ml. of the diluted antiserum was combined with 5 ml. of 1.25% suspension of the formalinized red cell-BDB-CGTH conjugate. The mixture was shaken at room temperature for 20 minutes, washed 2 times by centrifugation from 25 ml. of VBS-albumin and resuspended in 4 ml. of VBS-albumin. This 1.5% suspension was divided into 1-drop portions and placed in 10 x 75 mm. glass tubes and 0.1 ml. of undiluted VBS containing 750 mg. percent albumin and 2% sucrose were added to each tube. The tubes were then lyophilized.

The simple one-tube test is performed by adding 1 drop of urine to be tested to the lyophilized tube, followed by 9 drops of distilled water. At the end of 2 to 4 hours a button of the red cells-BDB-CGTH conjugate will be easily discernible at the bottom of the test tube in the case of pregnant urine. The cells will appear agglutinated in the case of a non-pregnant urine as shown in Table III.

TABLE III.—ONE-TUBE TEST FOR PREGNANCY

| Control (10 drops H₂O) | Tests (1 drop urine, 9 drops H₂O) | |
|---|---|---|
| | Non-pregnant | Pregnant |
| + | + | − |

+indicates agglutination; −indicates no agglutination.

Lyophilized tubes were stored for three months at room temperature and when reconstituted performed equally well with freshly prepared tests.

To summarize briefly, the instant invention comprises the diagnostic test for pregnancy which is based upon an immunological reaction between CGTH and its antibody. The test comprises an immunological indicator system which depends upon a combination of a particulate material and CGTH and the antibody for this hormone. The test is so devised that when the immunological indicating system is contacted with the body fluid containing CGTH an observable physical change occurs which is evidenced by a change of particulate size, a change of color or some other observable phenomenon.

What is claimed is:

1. An immunological indicator system for use in the detection of chorionic gonadotropin in a urine sample comprising in combination the antibody for chorionic gonadotropin and an indicator material comprised of a particulate material which has been conjugated with chorionic gonadotropin using bis-diazobenzidine, said particulate material being selected from the group consisting of red blood cells and formalinized red blood cells.

2. The indicator system of claim 1, wherein the particulate material is formalinized red blood cells.

3. The indicator system of claim 1 wherein the particulate material is formalinized red blood cells and said combination has been lyophilized to powder form.

4. An immunological test for determining pregnancy which comprises contacting a urine sample with the antibody for chorionic gonadotropin and subsequently contacting the urine-antibody mixture with an indicator material comprised of a particulate material which has been conjugated with chlorionic gonadotropin using bis-diazobenzidine, said particulate material being selected from the group consisting of red blood cells and formalinized red blood cells, and stirring the resulting mixture, whereby absence of chorionic gonadotropin in the urine sample results in an observable hemagglutination in the final mixture.

5. An immunological indicator material for use in conjunction with the antibody for chorionic gonadotropin for the detection of chorionic gonadotropin in a urine sample comprising a particulate material conjugated with chorionic gonadotropin using bis-diazobenzidine, said particulate material being selected from the group consisting of red blood cells and formalinized red blood cells.

6. The indicator material of claim 5, wherein the particulate material is formalinized red blood cells.

7. The indicator material of claim 5, wherein the particulate material is formalinized red blood cells and said indicator material has been lyophilized to powder form.

8. A method for producing an immunological indicator system for detecting chorionic gonadotropin in a urine sample which comprises preparing a suspension of chlorionic gonadotropin and a particulate material selected from the group consisting of red blood cells and formalinized red blood cells in a saline solution, adding thereto with agitation bis-diazobenzidine, recovering the indicator material formed and adding thereto the antibody for chorionic gonadotropin.

9. The method of claim 8, wherein the particulate material is formalinized red blood cells and the mixture formed is then lyophilized to powder form.

10. A method for producing an immunological indicator material for use with the use with the antibody for chorionic gonadotropin in the detection of chorionic gonadotropin in a urine sample which comprises preparing a suspension of chorionic gonadotropin and a particulate material selected from the group consisting of red blood cells and formalinized red blood cells in a saline solution, adding thereto with agitation bis-diazobenzidine, and recovering the indicator material formed.

11. The method of claim 10, wherein the particulate material is formalinized red blood cells and the indicator recovered is lyophilized to powder form.

12. An immunological indicator system in dry powder form which comprises the residue after lyophilization of formalinized red blood cells which have been conjugated with chorionic gonadotropin using bis-diazo benzidine and the conjugate subsequently complexed with the antibody of chorionic gonadotropin.

13. An immunological test for the pregnancy hormone in urine which comprises the steps of contacting a urine sample with an antibody for chorionic gonadotropin and subsequently contacting the urine-antibody mixture with an indicator material which comprises a complex of red blood cells with bis-diazo benzidine and chorionic gonadotropin whereby absence of chorionic gonadotropin in the urine sample results in an observable hemagglutination in the final mixture.

References Cited by the Examiner

UNITED STATES PATENTS 3,088,875    5/1963    Fisk _____ 167—84.5

OTHER REFERENCES

Chase, Yale J. of Biol. & Med., Vol. 17, 1945, pp. 517–538.

Chem. Abs., ACS, Vol. 54, p. 5922b (Arch. Inst. Pasteur Matagascar, Vol. 27, 1959, pp. 85–8).

Cole, J. Experimental Med., Vol. 102, 1955, pp. 631–645.

Csizmas, P.S.E.B.M., Vol. 103, No. 1, January 1960, pp. 157–160.

Drug Trade News, 36:26, Dec. 25, 1961, p. 28.

McKean, Amer. J. of Obs. & Gyn., Vol. 80, September 1960, pp. 596–600.

Polski Tygodn, Lek., Vol. 15, August 8, 1960, pp. 1217–1219.

Read, A.M.A. J. of Diseases of Children, Vol. 96, 1958, page 538.

Segre, J. Immunology, Vol. 78, 1957, pp. 304–309.

Stavitsky, J. of Immunology, Vol. 74, 1955, pp. 306–312.

Strausser, Ph.D. Thesis, Rutgers Univ., June 1958 (microfilm 59–1831 of University microfilms, Ann Arbor, Michigan), pp. 1–9 and 64–80.

Schuyler, PSEBM, Vol. 75, November 1950, pp. 552–557.

Wide, Acta Endocrinologica, Vol. 35, October 1960, pp. 261–267.

JULIAN S. LEVITT, *Primary Examiner.*

FRANK CACCIAPAGLIA, JR., *Examiner.*